April 19, 1927.  
A. HERNANDEZ-MEJIA  
1,624,947  
MOTION PICTURE PHOTOGRAPHY AND PROJECTION  
Filed Dec. 6, 1918  3 Sheets-Sheet 1
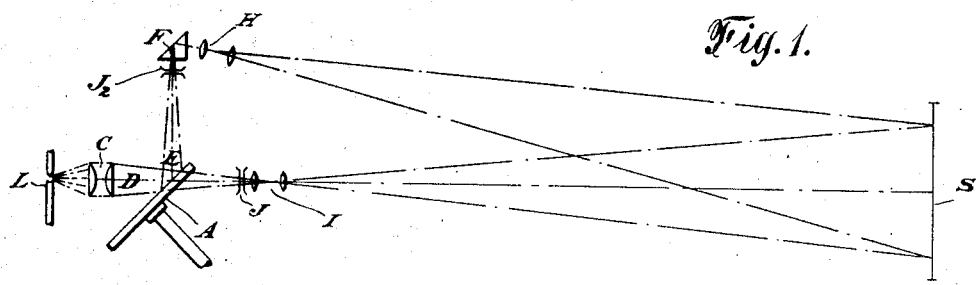
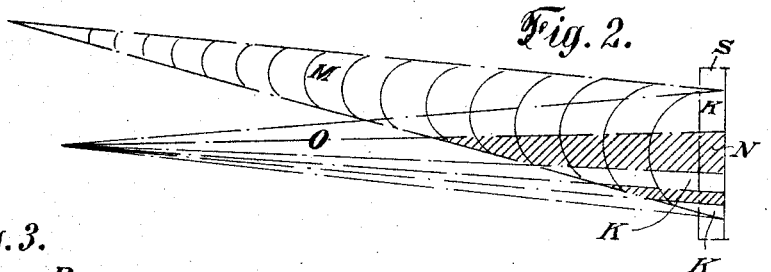
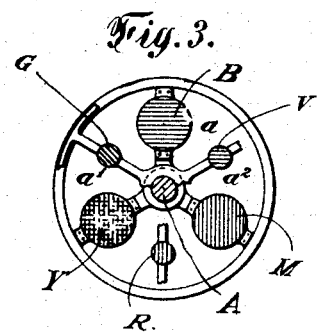
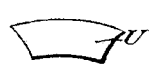
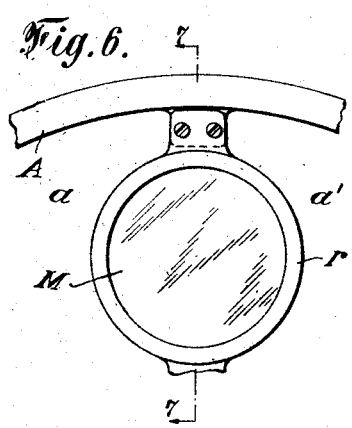
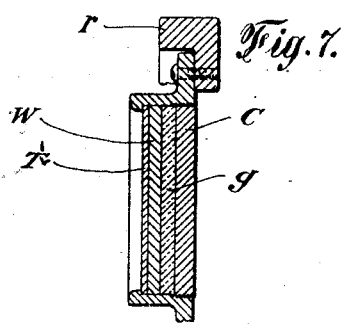
Inventor  
Arturo Hernandez-Mejia April 19, 1927.
A. HERNANDEZ-MEJIA
1,624,947
MOTION PICTURE PHOTOGRAPHY AND PROJECTION
Filed Dec. 6, 1918    3 Sheets-Sheet 2
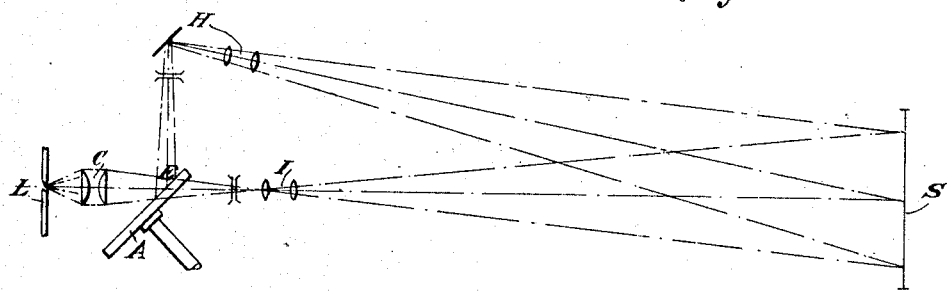
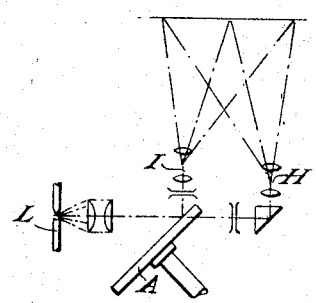
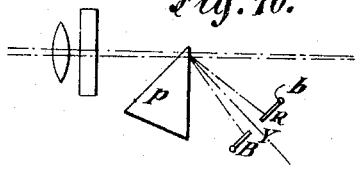
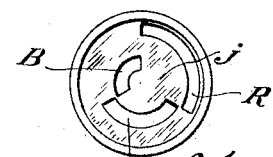
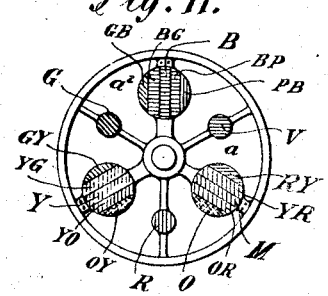
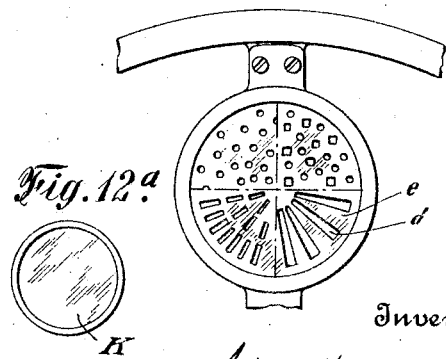
Inventor
Arturo Hernandez Mejia

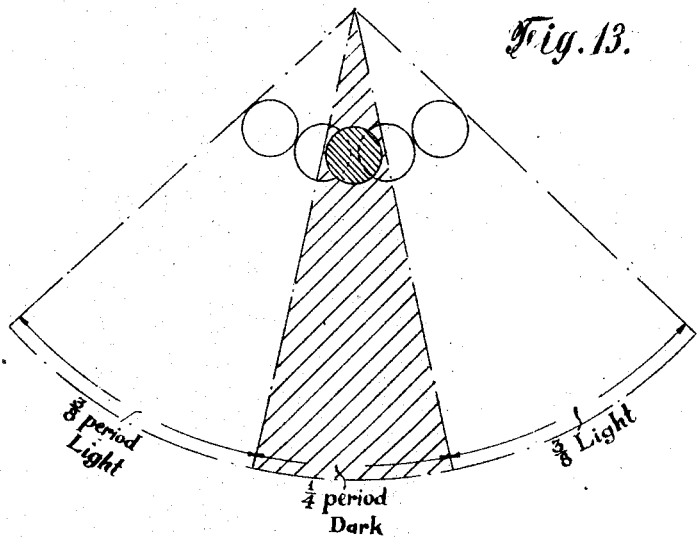
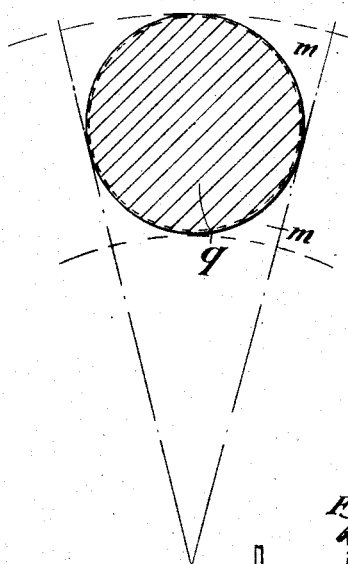
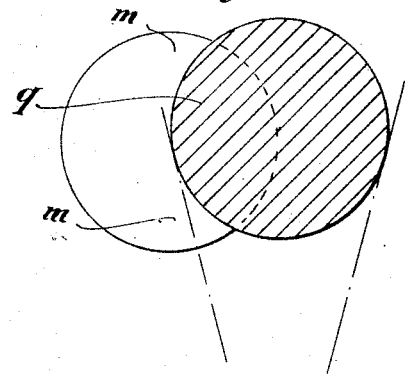
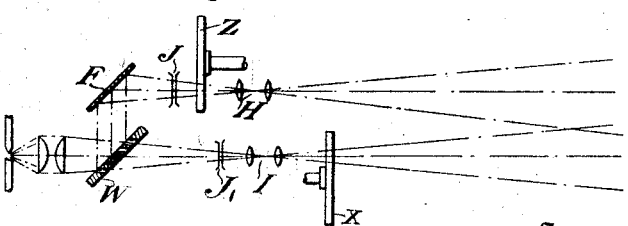

Patented Apr. 19, 1927.

1,624,947

UNITED STATES PATENT OFFICE.

ARTURO HERNANDEZ-MEJIA, OF NEW ROCHELLE, NEW YORK; MARGARET N. HERNANDEZ, ADMINISTRATRIX OF SAID ARTURO HERNANDEZ-MEJIA, DECEASED, ASSIGNOR TO COLORGRAPH LABORATORY, INC., OF NEW YORK, N. Y., A CORPORATION OF NEW YORK.

MOTION-PICTURE PHOTOGRAPHY AND PROJECTION.

Application filed December 6, 1918. Serial No. 265,657.

This invention relates to color motion pictures, and has particular reference to an improved method, and apparatus and product whereby pictures can be photographed and projected quickly in approximately all the colors of nature. By this invention, pictures can be made and exhibited within as short a time as one to two hours, or sufficient time to develop and dry the negative and its positive. It is a distinct departure from any of the known and practised processes, which are now grouped into additive and subtractive methods. This method can be classed as a total light process because it does not depend upon the retention by the human eye of the image presented on the screen, during and until after a period of darkness or shutter space. The total light of the source of illumination is always on the screen, less only the usual loss by absorption of the glass or other optical parts of the projection system.

The negatives are taken by usual cameras, fitted with color separating filters, in consecutive series of two, three or more pictures, each series consisting of the colors which together make white; for instance, in two color separation, orange-red and blue-green, (plus a small amount of blue-violet); in three color, red, green and blue-violet; in four-color, red and green, blue-violet and yellow; in six color, red, orange, yellow, green, blue and violet, etc. A positive is made from this negative, and placed in the projector in the usual manner. The departure consists in the arrangement of, or addition to, the projecting machine herein described.

In the accompanying drawings,—

Fig. 1 is a diagrammatic elevation showing in outline the apparatus for carrying out this invention, and the manner in which the light therefrom is projected upon the screen.

Fig. 2 is a diagrammatic elevation illustrating in detail the manner in which the apparatus produces the required effects upon the screen.

Figs. 3, 4, 5, 6 and 7 illustrate details of the apparatus forming part of this invention.

Figs. 8, 9, and 10 are diagrammatic elevations showing modifications of the invention.

Figs. 11, 12, and 12$^a$ show modifications of the details shown in Figs. 3, 6, and 7.

Figs. 13, 14 and 15 are diagrammatic views of the operation of the shutter of this apparatus.

Fig. 16 is a diagrammatic elevation illustrating further modifications of this invention.

Figure 1 is a plan view showing the path of the light rays, with its interrupted deflections, and reflections, and here, L, is the light source, C, is the condenser, D, is the light rays E is the reflection surface of disc A, in the path of light, A is the interrupting rotation disc or shutter, J, is the aperture plate for the film, $J^2$ is the secondary aperture plate which carries no film, I is the picture lens passing direct light, F is the stationary mirror, prism or reflector, H is the auxiliary ray lens, and S is the screen.

Figure 2 is a plan view showing the action of the colored rays on dark or light areas on the screen, and K, are the light spaces where ray M has no visible effect, N are the dark spaces which are colored by ray M, O, are the direct rays of lens I, and M, are the auxiliary rays from lens H. The color rays of M vary with the revolutions of disc A. S is the screen.

Figure 3 shows a light shift disc which operates also as a shutter, to cover the period of changing the film and in which A is the disc, $a$, $a^1$, $a^2$, are clear cut out spaces for the white light to pass through, R is the red segment, G is the green, V is the blue-violet; B is the blue; M is the magenta and Y is the yellow; the first three being the colors of the taking screen, and the second three their complementaries.

Figure 4 shows a way of compensation, in which Y is the proportionate preferred circle for yellow, B is the preferred circle for blue, M is the preferred proportionate circle for magenta, owing to the difference of continuity of retention of these colors by the eye. The balance of the area reflects white light.

Figure 5 shows three other geometrical forms of the reflecting and darkening shutter segments, used in preference to the customary radial openings, the circular, semi-circular, elliptical and similar curved surfaces being preferred, although radial openings or segments can be used, though less effectively.

Figure 6 shows a sector of the light deflecting disc A and one method of fastening same to the disc.

Figure 7 shows the sector, in section, carrying a transparent colored substance, T. G is a polished surface of metal, glass or other mirror, W is the color filter, which may be either blue, yellow or magenta and made of liquid, gelatine or other suitable substance; C is the backing preferably screwed onto r the holder to fasten device to A.

Figure 8 plan shows an alternative method of deflecting the auxiliary rays before they reach the lens H, and a filter disc Q as an optional way of supplying the periodical color instead of providing the disc A with a color reflecting surface.

Figure 9 shows an arrangement for lateral projection, using a prism to turn the direct picture rays at right angles, the flooding disc diverting the color rays before reaching the film during the periods of film shift. This arrangement is very suitable for home projectors and compact outfits.

Figures 10 and 10ª show, in elevation and plan view, respectively, how the color can be supplied to the screen in a flood, by prismatic separation of the spectrum, instead of gelatine, liquid or other similar color filters. The rotated disc j with openings R, B and Y, will permit selected portions of the spectrum to pass, while shutting out other portions, and the prism p can be slightly oscillated to throw particular sections of the spectrum through the fixed opening B, R, or Y. The results on short throws are very beautiful and its adaptation to longer projection is limited only to the perfection of the materials and instruments used.

Figure 11 shows the preferred prismatic order of the colors used on filter disc A which is found very desirable in effacing any possible flicker due to the difference between the white light projections direct to the screen, and the flood light from the auxiliary flooding ray. It will be understood that this possible flicker is in any case a great deal less than in ordinary black and white projection, and the prismatic order of the colorings is used to further reduce any remaining flicker or oscillation of the light waves that may arise from the normal or slower motion or rotation of the pictures, compared to processes requiring 32, 64 or more projections per second.

Figure 12 shows the smaller intermediate circles, or other shaped shutter surfaces on disc A which can be solid color reflectors or perforated to allow white light to pass directly to the screen. In this case, these intermediate discs or the like can be made larger in area, and the color which they contribute will then be added to the screen simultaneously with the white light passing through the film, and the picture will then simultaneously be colored in the dark areas, and white in the clear areas. In this Fig. 12, d are open spaces which can be of any shape desired and e, the reflecting surfaces, covered with color particles, or colored gelatine, or the like. Or these discs can be transparent Fig. 12ª, and the surface polished to reflect light as well as transmit it; in this case, K represents the transparent and polished surface. These openings occur when the film is stationary.

Figure 13 shows the partial and total eclipse of the lens by the circular or other obscurator during one quarter of the period of each segment of the disc A, and with Figures 14 and 15 shows that the light on the screen is, at certain periods partly transmitted by the direct lens and partly carried around the auxiliary system in a colored beam of flooding light, both reaching the screen at the same time causing superposition of both rays.

Figures 14 and 15 show geometrically why the circular construction is preferred in making the shutter spaces and the reflecting surfaces; the lenses usually being round in shape, the round obturator conforms better to that shape, while the radial sectors are less efficient and more wasteful of light. M represents the wasted areas and q, the eclipses.

Figure 16 shows an optional use of this invention in which the reflecting and perforated obturation w, or any body which permits light to partly go through, and partly to be reflected to form an auxiliary beam, is stationary, the color periods being supplied by a revolving or shifting device z, which carries the color filters, and the direct rays are interrupted during the film shift by a shutter of usual pattern x. In this form of application both rays are superposed on the screen.

The preferred method of practising this invention is by the use of the three color separation negative and its positive, and the projection is accomplished in the following manner.

By the use of a rotating disc we can mix three primary colors, which by the aid of white and black will enable us to reproduce any shade, hue or color to which we are accustomed. By varying the sizes of the three sectors, and adding two more, one black and one white we can match tints in intensity. Existing methods of photographically reproducing nature are now broadly divided into "subtractive" processes in which the colors used act as absorption screens for each other, the final color being that which remains after absorption has taken place, quenching all the rest; and "additive" processes in which color is added to color, although no purely additive process is known, since addition and subtraction both play a part in most practised color-photography methods.

The rays of light proceeding from the arc or other illuminant are transmitted by the usual condensers and proceed to the aperture-plate on the motion-head in the usual manner. Somewhere between the light source and the film, a shutter or disc of special design is introduced. For the sake of explanation, and disregarding the possibility of burning the film by opening the safety-gate, let us stop, theoretically, this new shutter or light-shift disc, A, Fig. 3 at a period when any of its open or clear portions $a$, $a^1$, $a^2$ are on the path of the light rays. The light passing through the disc openings also passes through the film at this moment stationary, reaching the screen where it has not been stopped or absorbed by varying degrees of black silver deposit on the positive film. When such absorption occurs on the film, the corresponding area on the enlarged image on the screen, will now be totally dark, hence black to the eye. Where no interruption is found, the corresponding area on the screen is now white, or brilliantly illuminated. Intermediate shades now appear as grays on the screen, that is to say, dark plus more or less illumination. Let us now move our disc A slightly, and bring circle B into the path of the light rays at an angle of say forty-five degrees. As the back of this circle is opaque, it totally eclipses the light from film at the aperture, and from lens I; but now the light is not absorbed or lost as in usual projection heretofore. It is diverted by the interrupting disc, section B which is opaque on the back, but reflecting on the side facing the condensers and at an angle throws the rays towards fixed reflector or prism F which in turn deflects the rays towards the screen through aperture $J^2$ and auxiliary lens H, the focus of which is such that it throws an area about the size of the one by lens I, at screen space S. The rays of lens H are at this moment blue, and the screen S is flooded with brilliant spectrum blue light corresponding to the dyed filaments covering mirror $g$ of reflector B, Figs. 3 and 7. The last impression the eye has had is of lighted and darkened areas. The blue light falling on recently brilliant white areas, will affect these areas by persistence of vision but little; the size of circle B will determine this relation. But where the blue light falls on recently totally dark areas, there is no bright white light to overcome, and the blue rays will lighten the dark area a blue color. We now move our interrupting disc another section, and we permit the white lighted picture to reappear, then divert the light through circle M, and flood the screen with pink light causing the same phenomena as with the blue light. Finally we move to section Y first passing the lighted picture, and then diverting the light after filtering it yellow, to the screen. The relative sizes of circles B, M and Y provide for greater or lesser persistence in the eye, it being well known that blue light impressions will persist longer than yellow light impressions, and red light impressions still less than yellow. We have stopped the disc for the purposes of examination, but in practice, the same is rotated at the usual rate of projection, so that the light is all the time on the screen, either through lens I or lens H and there being no dark periods on the screen, there is no visible flicker. It is obvious that with this device the usual before-the-lens shutter can be dispensed with and should be removed. In Fig. 3 smaller interrupting and reflecting circles R, G, and V are shown about midway in the spaces for direct light. In alternating current projection, these act as a two-blade shutter would, breaking up any possible flicker due in this case only to the eye being sensible to the difference between the total of red, violet, and green, or white light and part of its component elements, this sensibility of course being proportionately much less than in the case of ordinary black and white projection, where the difference is between all colors white, and the absence of any color at all, black. In the case of direct-current projection, the place of the three blade shutter is supplied by increasing the number of interrupting and reflecting circles in areas $a$, $a^1$ and $a^2$, these sections carrying the intervening color. The prismatic order of the spectrum in which these reflectors are arranged is very important, as it has been found that such an arrangement softens the action of the light changes on the retina of the eye, as described and shown in my pending patent application, Serial No. 252,840.

It will be seen by the above description that the novelty of this invention resides principally in applying the colors to the images separated by the camera filters, not through the film but on the screen, and this gives greater efficiency for the given amount of light, since the light usually wasted in darkening the screen during the period of film change from one image to another, is now utilized. It is obvious that light which is sent to the screen through filters of individual colors, and then is further reduced by going through the silver deposit on the film, and then by the before-the-lens shutter, as in former processes is of far less intensity and volume than white light to which colored light (which has not passed through the film,) is added as a flood.

Another novel feature is the circular character of the light interruptions and reflections, as distinguished from radial openings and shutter spaces usually shown and practiced, affording a much better control of proportions between the functions and visibilities of various colored lights. This is equally true in taking as well as in projecting. In the taking filter, the openings in the filters are made in circular form, along the circular path of the travel past the camera lens, which being circular in form, are eclipsed truer and with less loss of effectiveness, by a circular stop or shutter, than with a radial or rectangular or triangular one. The same applies to the condenser rays, it having been found that radial openings or reflectors would entail a much larger and more unwieldy disc.

This invention is not limited to devices which are solid reflectors as well as solid interruptors, but comprises as well reflectors which are pierced by regular or irregular openings to give both direct rays and reflected rays to the screen, and experiments along these lines give very acceptable projection, having the same light utilizing and saving features, but the short periods of film changing require favoring the colored light reflector areas as against the direct light areas.

Experiments with dichroic reflectors, half silvered and platinized glass, etc., have also been carried out, but the action of the light on these reflecting and transmitting mediums destroys their efficiency in a short time, although the principle of using them to utilize the wasted light in order to obtain an auxiliary beam of colored or uncolored light is part of this invention. Prisms obviously also divide the light, with some saving in its auxiliary use as explained herein, but the devices shown in the drawings have given me the best results. A combination of pierced segments or circles Fig. 12, in the smaller areas, A, A$^1$, A$^2$, is advisable.

This invention is not limited to color projection as by simply changing the disc A for one not having its circular areas covered by color filters, the projection can be made of usual black and white films, but very much improved by the practical absence of flicker, the auxiliary side-ray of white-light preventing the usual dark period on the screen with its attendant pulsations.

The following results are obtained by this process on projection. Whites are obtained by light passing through the clear gelatine, celluloid, support or film used. White snow, being recorded on the negative by a very dense silver deposit, its correspondent positive will have absolutely clear areas where the snow is photographed. Placed on the path of the direct rays, the screen is illuminated brightly, white, in the areas corresponding to the snow. It is noted that this is similar to the subtractive processes and in opposite effect to all additive processes where two or more colors added to one another constitute or form white-light on the screen. Blacks are caused by the dense areas of the positive film which permit no light to pass to the screen graded and modified only by color additions. Grays are the result of similar deposits in varying degrees which partly permit and partly prevent white light from reaching the screen. Blues, reds, yellows and similar solid colors to the number corresponding to the separations chosen for the taking camera, are produced on the screen by the flooding of the solid color over the screen, which produces the novel phenomena that the solid color will impart its colored luminosity on the black or darkened areas at the time, in its sequence, when these darkened areas correspond to the color recorded. It is true that the flood of solid color extends also over the white area, the white snow, for instance. But in practice it is found that as the projection of the white light is much brighter and of much longer duration than the colored ray, the white is not affected, since light, plus light (even if of only one of its components) equals more light. This is not the case in the dark areas, since dark, plus ever so little light of any color equals some light.

Blacks will be recorded on all three positives by a dense silver deposit, on projection will present to the eye:

1st picture, black 75 plus magenta 25, equals dark red; 2nd picture, black 75 plus blue 25, equals dark blue; 3rd picture, yellow 75 plus blue 25, equals dark yellow.

(The usual projector's Geneva movement claims one to five ratio, but taking one to three as the most favorable, we get 75 dark, plus 25 color.)

25 each of red, blue and yellow, equals 25 blue-white (the blue being in excess).

25 blue-white equal 20 white in intensity; hence 225 black and 20 white equals gray-black or practically black. In connection with the above ratios, the following results of experiments with this process give the following interesting data;

$\frac{1}{6}$ red plus $\frac{1}{6}$ green plus $\frac{1}{3}$ violet equals dark gray, $\frac{1}{3}$ red plus $\frac{1}{3}$ green plus $\frac{1}{3}$ violet equals gray, $\frac{1}{2}$ red plus $\frac{1}{2}$ violet equals purple, $\frac{1}{8}$ red plus $\frac{7}{8}$ green equals gray-yellow, 1 red plus 1 green equals yellow, $\frac{3}{4}$ red plus $\frac{1}{4}$ green equals orange, 5 red plus 1 blue equals magenta, 1 red plus 1 blue equals violet, 1 red plus $1\frac{1}{2}$ green plus 1/20 blue equals white, 2 red plus 3 green equals yellow, 20 red plus 1 blue equals pink, 1 red plus 1 greenish-blue equals white, 1 red plus 1 yellow equals orange, ½ violet plus ½ green equals blue, 1 violet plus 1 green plus 1/10 red equals sky blue, 1 violet plus 1 green equals blue, 30 green plus 1 blue equals blue green, 1 yellow plus 1 blue violet equals white, 1 green plus 1 pink equals white, 1 orange plus 1 blue equals white.

So the eye receives the impression of many white areas, many dark areas, some of these dark areas at regular periods being colored with some particular hues, and other areas colored with different hues or blending of prismatic hues in a prismatic order. So long as the eye is not asked to assimilate two or more strong colors in order to form a white impression, it will not be fatigued, and it will not be necessary to run the projector at a faster rate than the usual rate at which the negative was taken, usually sixteen pictures to the second or the foot of film.

This invention is not limited to one deflection of the initial light, nor to one lantern. Additional and separate light from the lanterns periodically added to the screen, render stronger colors and in very long throws of projection are desirable and help materially, but for ordinary projection the arrangement shown gives satisfactory results.

Having described my invention, I claim:—

1. In motion picture photography and projection, the method of producing color motion pictures, which consists in the utilization of a film having a series of sets of color records, projecting said records in black and white upon the screen, and during the period of film movement occurring subsequent to the projection of each record, casting upon the screen a flood of light which is of a color corresponding to such record.

2. In motion picture photography and projection the method of producing color motion pictures, which consists in the utilization of a film having color records, projecting said records in black and white upon the screen, and during the period of film movement occurring immediate to the projection of each of said records casting upon the screen a flood of light which is of a color corresponding to such records.

3. In motion picture photography and projection the method of producing color motion pictures, which consists in the utilization of a film having a series of sets of color records, projecting said records in black and white upon the screen, and intermittently casting upon the screeen floods of colored light that correspond to the colors represented by said records.

4. In motion picture photography and projection the method of producing color motion pictures, which consists in the utilization of a film having color records, projecting said records in black and white upon the screen, and projecting colored light to the screen between the projection of successive pictures.

5. In motion picture photography and projection, the method of obtaining colored motion pictures which consists in the utilization of a film having a series of sets of color records, projecting said records to the screen in black and white state, and immediate to the projection of each record projecting a flood of light upon the screen having a color corresponding to such record, whereby the darkened areas of the image upon the screen will be supplied with color proportionately to their densities without materially changing the white areas of the image.

Signed at the city of New York, in the county of New York, and State of New York, December, A. D. 1918.

ARTURO HERNANDEZ-MEJIA.